Aug. 25, 1970     H. W. G. OCKER     3,525,124
EXTRACTING APPARATUS FOR PROCESSING MATERIAL HAVING
ELIMINABLE COMPONENTS
Filed Nov. 15, 1968     2 Sheets-Sheet 1

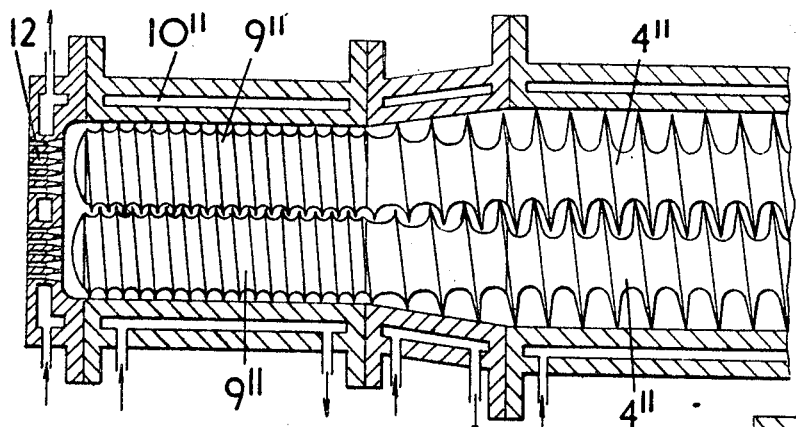
FIG. 7.
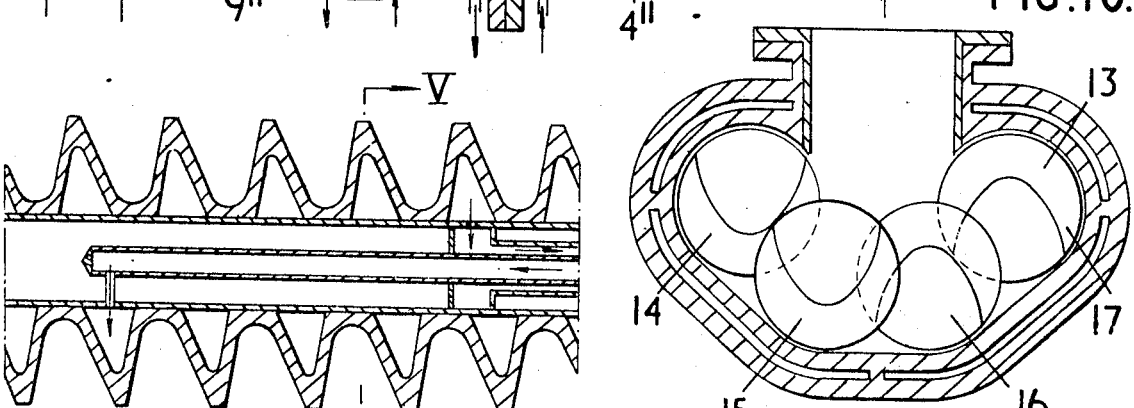
FIG. 10.
FIG. 8.
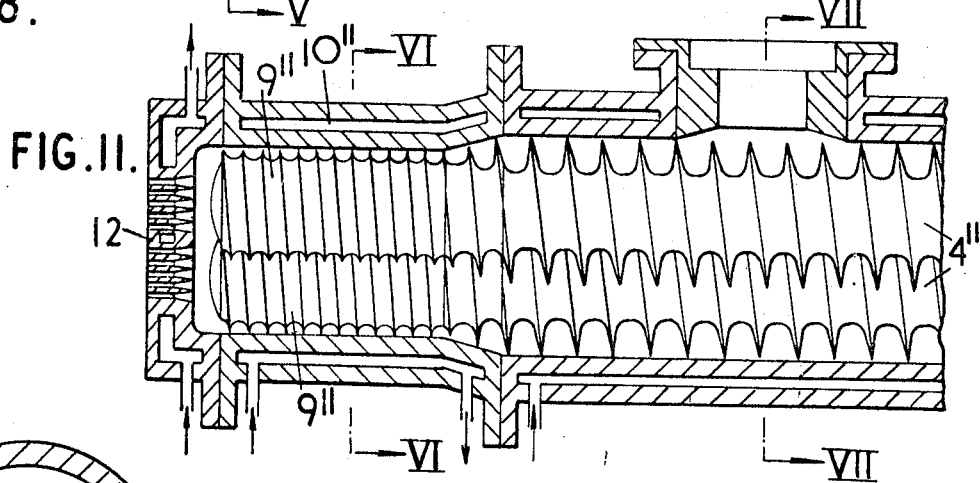
FIG. 11.
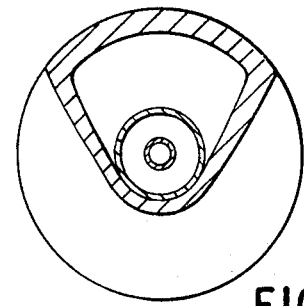
FIG. 9.
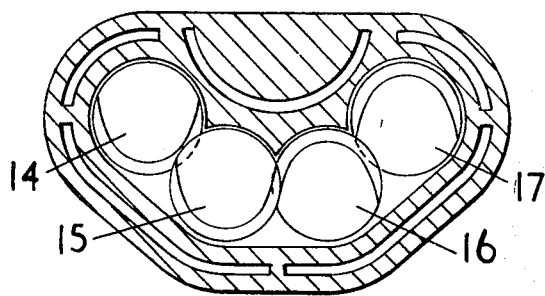
FIG. 12.

INVENTOR
HERBERT WILHELM GUSTOV OCKER
BY Glascock, Downing
& Seebold
ATTORNEYS

United States Patent Office 3,525,124
Patented Aug. 25, 1970

3,525,124
EXTRACTING APPARATUS FOR PROCESSING MATERIAL HAVING ELIMINABLE COMPONENTS
Herbert Wilhelm Gustav Ocker, Leonberg, Wurttemberg-Baden, Germany, assignor to Werner & Pfleiderer, Stuttgart-Feuerbach, Germany
Continuation-in-part of application Ser. No. 567,680, July 25, 1966. This application Nov. 15, 1968, Ser. No. 776,210
Claims priority, application Germany, Aug. 13, 1965, W 39,725
Int. Cl. B29b 1/10
U.S. Cl. 18—12                    8 Claims

ABSTRACT OF THE DISCLOSURE

An extracting apparatus for processing synthetic materials including extracting eliminable components, comprising at least a pair of threaded shafts rotatably mounted in the housing each shaft having at least two conveying and milling sections and an obstructing section therebetween. Provisions are made for heat treating and applying pressure on the material in the sections independently of one another. The space between the root of the screw threads in the conveying and milling sections and the inside of the housing diminishes in the direction of flow of material to compensate for loss of volume thereof.

---

This application is a continuation-in-part application of Ser. No. 567,680 my application relating to Process and Device for Step-by-Step Withdrawal of Eliminable Components, filed on July 25, 1966.

The invention relates to a device for the step-by-step extraction of components from synthetic material being conveyed through several stages.

In previously known devices of this type the material is introduced into a housing in which it is exposed to milling or the like under the influence of heat and pressure. In such devices the volume of the material diminishes as it is being processed due to the elimination of eliminable components. However, due to the diminishing volume, difficulties arise with respect to the treatment of material, in particular, with respect to delivery in that it is desirable to avoid residues in the end product which can be detrimental to the quality. A continuous delivery of material, in a predetermined form and of a predetermined volume has in the past not been possible; accordingly, the particular properties of the end product could not be guaranteed especially in the treatment of sensitive materials unstable within a given temperature range.

An object of the invention is to do away with the aforesaid disadvantages. Accordingly, it is now possible to obtain a constant flow of processed material from the delivery end of the apparatus as well as treat the material in any individual stage in the apparatus according to any particular requirements. Such treatment may, for example, include the removal of the eliminable components from the state, degassing or providing of a vacuum.

The invention includes an intermeshing pair of helices wherein the outer dimension of the combined pair of shafts in the first two stages remains constant. Due to the reduction in volume of material as a result of the processing of the material the invention requires the space between threaded shafts and the inner diameter of the housing to diminish towards the outlet end thereof. Since the helices are arranged on common shafts, according to the material to be handled, various sized helices may be employed in the various stages which can be easily combined in a simple way into a unit.

The invention consists in an extracting apparatus comprising a housing having an inlet and an outlet for receiving and delivering respectively material having eliminable components, a pair of intermeshing screw-threaded shafts disposed in the housing for conveying and processing the material, at least one opening in the housing for passing out eliminable components, the space between the root of the screw-thread on the shafts and the adjacent interior of the housing decreasing between the inlet and outlet to compensate for decrease in volume of the material being processed and thereby providing a constant flow of material to the outlet.

The invention further consists in an apparatus for processing material having eliminable components comprising: a housing having an inlet and an outlet, a pair of substantially parallel screw-threaded shafts rotatably mounted in the housing, at least one opening in the housing for passing out eliminable components, each of the shafts having two conveying and milling sections each of which being followed by an obstructing section for effecting a seal between the preceding milling and conveying sections and subsequent sections, the interior surface of the housing adjacent one of the obstructing sections on each shaft being dimensioned to effect a seal therebetween, the space between the root of the screws in the conveying and milling sections and the adjacent interior surface of the housing decreasing from the inlet to the outlet to compensate for the decrease in volume of the material being processed.

The material is conveyed through a first stage with the addition of heat and at the end thereof an obstructing pressure is applied which effects sealing between the first stage and the next stage towards the outlet. The next stage includes a vacuum environment through which the material is conveyed. After passing through the vacuum stage, the material is again subjected to an obstructing pressure which effects sealing with respect to the vacuum stage and a subsequent delivery stage. Finally, the material is delivered from the delivery stage through the outlet in a predetermined volume, in a predetermined composition and at a continuous flow rate. Accordingly, it is now possible to guarantee definite temperature and pressure conditions in a particular stage and to thereby control degassing or withdrawal of eliminable products from the individual stage without effecting adjacent stages. It is now also possible to determine the end flow and end product consistency without significant variation.

The uniform delivery flow rate is now possible due to the diminishing space between the root of the thread on the shafts and the inner diameter of the housing. In this way it is possible to perform whatsoever treatments are desirable in a particular stage without effecting the continuous flow rate. Accordingly, material can be tempered in various stages e.g. heated, cooled or mixed with additives.

In the present device, the obstructing stages may include, for example, a reverse pitch screw-threaded portion or a truncated conical screw-threaded portion with a corresponding truncated conical housing section. In the latter type of obstructing stage, the screw-threaded section is of gradually diminishing cross-section in the direction toward the outlet end of the apparatus.

The delivery stage of the apparatus includes a simple conveyor screw-thread which is adapted to deliver the material in its desired composition or form. The delivery section however is accommodated in its own housing which is of smaller internal diameter compared to the main portion housing but the conveyor sections are integral with the threaded shafts in the main housing. With a delivery section of the aforesaid type, it is possible to deliver the volume to the outlet end at a predetermined rate of flow. In addition, each delivery section may include a moulding arrangement for forming an end product, for example, a granulating head. It is also possible to provide for further treatment of the processed material in the delivery section, e.g. tempering or providing additional additives. A built-in play can be adjusted to the size of the delivered end product if no additional moulding head, such as a granulating head, is utilised.

The delivery conveyors and their respective housing can be suitably connected to the threaded shafts and the main housing respectively.

Heat transfer means may also be provided in the housing and/or in the screw-threaded shaft. In the case of the heat transfer means in the housing, it is possible to provide individual heat treatment for each of the stages in order to fulfill particular requirements of temperature within that stage. With respect to the heat treatment means in the threaded shaft a path for a heat treating fluid may circulate within the thread of the shaft with inlet and outlet conduits located along the center of the shaft.

It has been determined that the pressure differential between the conveyor stage following and preceding an obstructing section is a function of the conveyor screw in the section following the obstructing section. In particular, it has been determined that the final pressure, that is the pressure at the end of the delivery stage, is inversely proportional to the length of the delivery section while holding the viscosity constant.

In the case where a vacuum is applied to the delivery stage, the pressure obtainable in the delivery stage may, in this case, also be determined as a function of the viscosity of the material to be processed and/or the length of the delivery conveyor screw section.

The invention will now be described with reference to the accompanying drawings which show embodiments of the invention, wherein:

FIG. 7 shows a detail of a top section of an alternative embodiment of the extracting apparatus shown in FIGS. 1 and 2;

FIG. 8 shows a detail of a threaded section including heat transfer means therefor;

FIG. 9 shows a section through the threaded section along the line V—V in FIG. 8;

FIG. 10 shows a section of the alternative embodiment of the extraction apparatus shown in FIG. 7 along the line VII—VII in FIG. 11;

FIG. 11 shows a side elevation view of the alternative embodiment shown in FIG. 7; and FIG. 12 shows a section of the alternative embodiment shown in FIG. 7 along the line VI—VI of FIG. 11.

Figure 1:
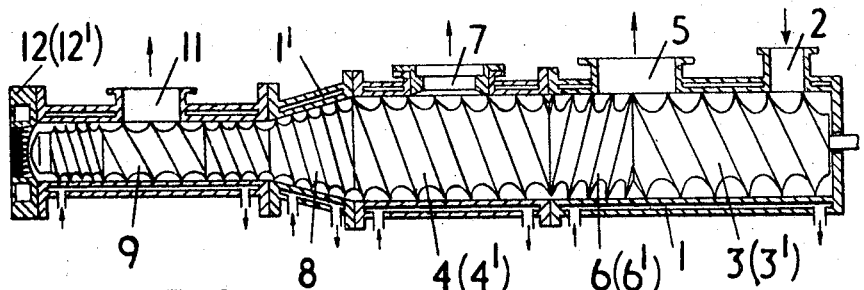
FIG. 1 shows a longitudinal section through an extracting apparatus having a pair of intermeshing screw-threaded shafts.
Figure 5:
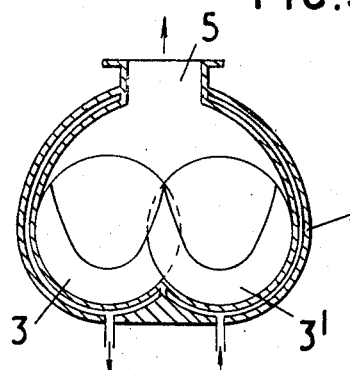
FIG. 5 shows a section of an extracting apparatus similar to that shown in FIGS. 1 and 2 along a line through opening 5 wherein the casing is domed above the helices at the degasing zone.

FIG. 1 shows a housing 1 having at one end on its upper surface an inlet 2 into which material to be processed is fed as indicated by an arrow thereat. A pair of intermeshing screw-threaded shafts are rotatably mounted in the housing 1. The first stage of the extracting apparatus includes a pair of conveying and milling sections 3 and 3' extending from the inlet end of the housing for conveying material towards the other end thereof. An opening 5 is located in the upper face of the housing (see also FIG. 5) through which eliminable compounds such as gas may escape. The first stage is heated or cooled by heat transfer means including passages provided in the housing through which circulate a heat transfer fluid as indicated by the arrows in FIG. 1.

The first stage is connected to an obstructing stage indicated by the obstructing sections 6 and 6' on the threaded shafts which are provided with reverse screw-threaded portions and which thereby seal off the first stage from the stage following the obstruction stage so that the first stage may have heat treatment or pressure treatment distinct from that of the subsequent stage.

A further milling and conveying stage including milling and conveying screw-threaded sections 4 and 4' is connected to the obstructing screw-threaded sections 6 and 6'. An opening 7 is provided in the upper face of the housing in this stage at which it is adapted to be connected to a vacuum means in order to place the stage under vacuum conditions. The section may also be provided with heat transfer means independent of the transfer means in the previous stages.

Truncated conical screw-threaded sections 8 and 8' are connected to the second milling and conveying sections 4 and 4'. These truncated conical screw-threaded sections 8 and 8' are surrounded by a housing portion which also has a truncated conical shape and co-operates with the truncated conical screw-threaded sections 8 and 8' and to form a second obstructing stage. As in the case of the previous stages, this section may also be provided with its independent heat transfer means located in its co-operating housing portion.

Figure 6:
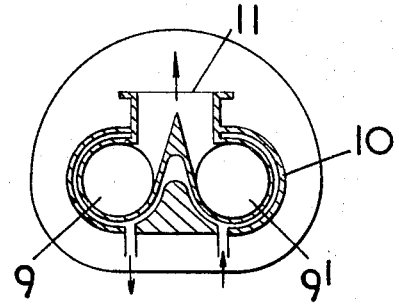
FIG. 6 shows a section similar to FIG. 3 of an extracting apparatus modified as in FIG. 5 and taken along a line through the opening 11.

The small diameter ends of the truncated conical sections 8 and 8' are connected to the conveying delivery sections 9 and 9'. These sections are provided with three different screw-threaded portions of varying or alternating pitch. Each of the conveying delivery sections are provided with an independent housing 10 and 10'. A further opening 11 is located in the upper face of the independent housing 10 and 10' as shown in FIG. 6. This opening 11 may be used for removing further eliminable components or for inserting additives in the delivery stage. At the end of the delivery stage are located delivery heads 12 and 12' which are connected to the independent housings 10 and 10' which can be formed as granulating heads or the like.

The screw-threaded sections 3, 4, 6, 8 and 9 are mounted co-axially on a single shaft, and similarly screw-threaded sections 3', 4', 6', 8' and 9' are co-axially mounted on an adjacent parallel screw-threaded shaft. A motor (not shown) drives each of these shafts either directly or through a gearing mechanism.

Figure 2:
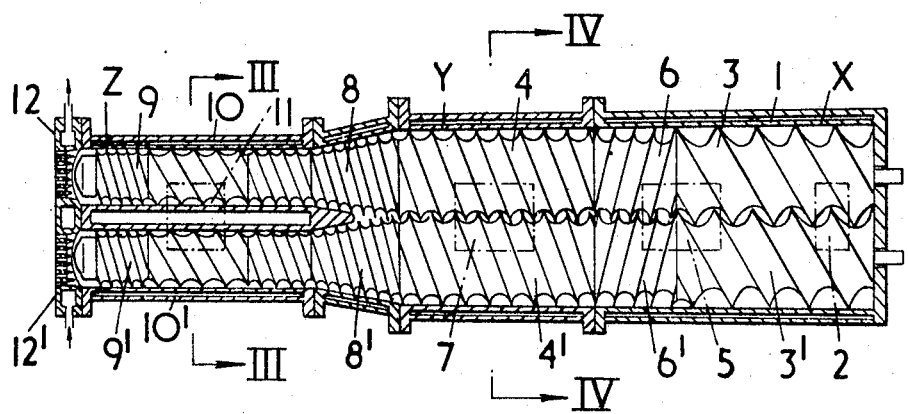
FIG. 2 shows the extracting apparatus of FIG. 1 in a top section.
Figure 3:
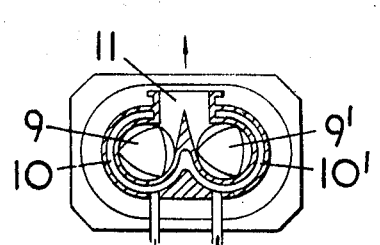
FIG. 3 shows a section of the extracting apparatus of FIGS. 1 and 2 along the line III—III in FIG. 2.
Figure 4:
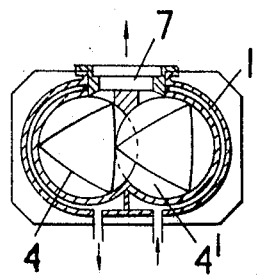
FIG. 4 shows a section of an extracting apparatus shown in FIGS. 1 and 2 along the line IV—IV in FIG. 2.

As noted above, each of the stages includes a heat transfer means including a passageway located in the housing which may be regulated independently of the heat transfer means in any of the other stages. Accordingly, substantial control over the temperature at any point along the length of the housing may be provided. A further heat transfer means is shown in FIG. 8 wherein a screw-threaded shaft as shown in FIGS. 1 and 2 is provided with a co-axially mounted inlet conduit which is connected to the hollow interior of the screw-threads by means of a radial conduit. The heat transfer fluid then flows through the interior hollows of the screw-thread. Another radial conduit is provided which connects the interior hollow of the screw-thread with a further co-axial conduit mounted about the inlet conduit through which the heat transfer fluid is passed out of the screw-threaded shaft. Such a heat transfer means may be used independently or in combination with the transfer means disposed in the housing.

The relationship between the inner wall of the housing and the root of the screw-thread on the shaft is such that the space therebetween is constantly diminishing along the length of the housing, i.e. the space at X is greater than the space at Y and the space at Y is greater than the space at Z. Accordingly, an even and constant flow of material through the delivery head 12 and 12' is possible. As has already been explained, the built in play between the independent housing 10 and 10' and its associated screw-threaded sections 9 and 9' may optionally be dimensioned so that the layer of delivery material therein is subjected to no undesired temperature reactions.

The connections between the various screw-threaded sections, for example 4 and 8 or 3' and 6', may be interchangeable. The housing sections 10 and 10' enclosing the delivery stages can be coupled with the tapering housing sections 1 and 1'. Such elements may be connected in any suitable manner within the scope of the invention.

FIGS. 7, 10, 11 and 12 show an alternative embodiment wherein four screw-threaded shafts 14, 15, 16 and 17 may be employed.

The axis of the screw-threaded shafts 14, 15, 16 and 17 are in a general U-shaped arrangement as shown in FIG. 12 in the delivery stage and FIG. 10 in the conveying and milling stage. The arrangement of the heat transfer means in the housing is somewhat different from the previous embodiment in that there are four sections corresponding to the screw-threaded shafts for heating or cooling the material being processed at various stages. Finally, it is recommended that the material should be spread out in thin layers in order to make the treatment intensive which makes the process herein more effective.

Within the scope of the invention, in addition to the modifications already mentioned with respect to the formation of the threaded shafts and the housing thereabouts various alternatives are possible, for example: the arrangement of the heat transfer means within the housing and the location of the openings through which the eliminable components are removed may be relocated. Similarly the mounting of the threaded shafts and the forming of the delivery head with respect to the independent housing and the conveying delivery stage may be modified.

I claim:

1. An apparatus for processing material having eliminable components comprising: a housing having an inlet and an outlet, a pair of intermeshing substantially parallel screw-threaded shafts rotatably mounted in said housing, at least one opening in said housing for passing out eliminable components, each of said shafts having two conveying and milling sections each of which is followed by an obstructing section for effecting a seal between the preceding milling and conveying section and subsequent sections, the interior surface of said housing adjacent each of said obstructing sections on each shaft being dimensioned to effect a seal therebetween, the space between the root of said screw-threaded shafts in successive conveying and milling sections and the adjacent interior surface of said housing decreasing from the inlet to the outlet to compensate for the decrease in volume of the material being processed.

2. An apparatus for processing material having eliminable components according to claim 1 wherein one of said obstructing sections is located between successive conveying and milling sections and includes a reversed pitched threaded section.

3. An apparatus for processing material having eliminable components according to claim 1 wherein truncated conical obstructing sections are connected to said shafts to define an obstructing section at the discharge end of the last of said milling and conveying sections and delivery sections are connected to each of said truncated conical obstructing sections, said conveying and milling section, said obstructing sections and said delivery section of each of said shafts being coaxial for conveying the material to said outlet.

4. An apparatus for processing material having eliminable components according to claim 3 wherein one opening is located between the first of said milling and conveying sections and the following obstructing section for permitting extracted materials such as gas to escape therethrough, another opening is located in the second of said milling and conveying sections for applying a vacuum thereto, and an opening is located in said delivery sections for passing out eliminable components or feeding in additives.

5. An apparatus for processing material having eliminable components according to claim 1 wherein a second pair of intermeshing screw-threaded shafts are provided.

6. An apparatus for processing material having eliminable components according to claim 1 wherein heat transfer means are provided in said housing in each section for heating or cooling each section independently of any other section.

7. An apparatus for processing material having eliminable components according to claim 1 wherein heat transfer means are provided in said shafts for circulating fluid along the interior hollows formed by the threads thereof.

8. An apparatus for processing material having eliminable components according to claim 1 wherein said outlet includes a granulating head.

References Cited
UNITED STATES PATENTS

| | | |
|---|---|---|
| Re. 23,948 | 2/1955 | Fuller. |
| 2,048,286 | 7/1936 | Pease. |
| 2,466,934 | 4/1949 | Dellenbarger. |
| 3,023,456 | 3/1962 | Palfey. |
| 3,060,512 | 10/1962 | Martin et al. |
| 3,082,816 | 3/1963 | Skedmore. |
| 3,115,675 | 12/1963 | Tedder. |
| 3,146,493 | 9/1964 | Steinle et al. |
| 3,151,192 | 9/1964 | Jacobs et al. |
| 3,164,563 | 1/1965 | Maxwell et al. |

WILLIAM J. STEPHENSON, Primary Examiner